United States Patent Office 3,578,695
Patented May 11, 1971

3,578,695
OLEFINIC NITRILES BY THE CATALYTIC OXIDATION OF OLEFINS USING HYDROGEN CYANIDE
Ernest C. Milberger, Solon, and Wilfrid G. Shaw, Lyndhurst, Ohio, assignors to The Standard Oil Company, Cleveland, Ohio
No Drawing. Filed July 26, 1967, Ser. No. 655,993
Int. Cl. C07c 121/32, 121/00
U.S. Cl. 260—465.3                    8 Claims

ABSTRACT OF THE DISCLOSURE

The instant application deals with a process for the manufacture of monoolefinically unsaturated aliphatic nitriles by the catalytic oxidation of olefin using cyanide and a molecular oxygen-containing gas, but no ammonia.

BACKGROUND OF THE INVENTION

The production of monoolefinically unsaturated nitriles is carried out by several processes, the most successful being the ammoxidation of an olefin over a supported metal oxide catalyst in a fixed bed or fluidized bed reactor. The reactions in the reactor are such that they are aided by the presence of an excess of ammonia in the feed stream to the reactor. The instant invention allows one to make the desired nitrile without using ammonia and using only hydrogen cyanide in its place. Though the precise mechanism by which hydrogen cyanide assists in forming the olefinically unsaturated nitrile is not known, it is possible that the nitrilo ion from the hydrogen cyanide molecule could transfer to the olefin under the conditions of the instant reaction.

In U.S. Pat. No. 3,050,546 a process has been disclosed wherein hydrogen cyanide is introduced along with the other reactants namely, olefin, ammonia, and a molecular oxygen-containing gas over a catalyst so that the net production of hydrogen cyanide is retarded. The instant invention does away with the use of ammonia and allows one to utilize hydrogen cyanide by itself in making the desired nitrile. This is of specific importance where an ammoxidation plant utilizing ammonia has already been built and where there is a by-product formation of hydrogen cyanide for which so limited a market is available that disposal of the remainder poses a problem.

The instant invention is also of importance to those interested in higher yields of by-product acetonitrile than those usually obtained in conventional ammoxidation reactions utilizing ammonia, air and olefins. It has been found that with many catalysts, and particularly with those described in U.S. Pat. 2,904,580; 2,941,007; 3,044,966 and 3,050,546, about twice as much acetonitrile is formed as is usually formed in the conventional ammoxidation reaction using ammonia.

The instant process utilizing hydrogen cyanide only is found to work with a number of catalysts which have heretofore been used solely for the ammoxidation of olefins in the presence of ammonia.

The present process may be practiced in either a fixed bed reactor or in a fluid bed reactor much the same as in the well-known ammoxidation reactions of propylene to acrylonitrile or isobutylene to methacrylonitrile.

In its broadest aspect, the present process comprises contacting a mixture comprising a monoolefin having from 3 to 4 carbon atoms such as propylene and isobuylene, molecular oxygen and hydrogen cyanide with a solid oxidation catalyst at an elevated temperature at atmospheric or near atmospheric pressure.

The preferred reactants in this invention are a monoolefin having the structure

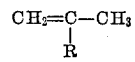

wherein R is a member selected from the group consisting of hydrogen and a methyl radical such as propylene or isobutylene, molecular oxygen and hydrogen cyanide. No ammonia is employed in the reaction mixture.

Any source of molecular oxygen may be employed in the instant process. The molar ratio of oxygen to olefin in the reaction mixture should be in the range of 0.5:1 to 5:1 and a ratio of about 1:1 to 3:1 is preferred.

The presence of saturated hydrocarbons, propane or n-butane, for instance in the feed mixture does not appear to influence the reaction to any appreciable degree and these materials appear to act only as diluents. Consequently, the presence of saturated hydrocarbons in the feed to the reactor is contemplated to be within the scope of this reaction. Similarly, other inert gaseous diluents such as nitrogen and the oxides of carbon may be present in the reaction mixtures without deleterious effect.

In the preparation of olefinically unsaturated nitriles the molar ratio of hydrogen cyanide to olefin in the feed may vary between about 0.05:1 to 5:1. There is no real upper limit for the hydrogen cyanide-olefin ratio. At ratios appreciably less than the stoichiometric ratio of 1:1, various amounts of oxygenated derivatives of the olefin will also be formed.

The use of water in the reaction mixture is within the scope of the present process. Improvement have been observed in reactions carried out in the presence of water as compared to similar runs made in the absence of added water. Consequently the presence of water has a marked beneficial effect on this reaction, but reactions not including water in the reaction mixture are not meant to be excluded from this invention.

In general, if water is to be included in the reaction mixture, the molar ratio of water to olefin should be at least about 0.25:1. Ratios on the order of 1:1 are particularly desirable but higher ratios may be employed, that is, i.e., up to about 10:1. Because of the recovery problems involved, it is generally preferred to use only so much water as is necessary to obtain the desired improvement in yield. It is to be understood that water does not behave only as a diluent in the reaction mixture, although the exact manner in which the water affects the reaction is not understood.

Other inert diluents such as nitrogen and carbon dioxide may be present in the reaction mixture; however, no beneficial effect on the reaction has been observed in the presence of such diluents.

Any one or more of several catalysts which will function in the reaction between propylene, oxygen and optionally ammonia to produce acrolein or optionally acrylonitrile are useful in the present process. A particularly desirable group of catalysts for the present process which are more fully disclosed in U.S. Pats. Nos. 2,904,580; 3,044,966; 3,050,546 and 2,941,007, are bismuth, tin and antimony salts of phosphomolybdic acid and molybdic acids, bismuth silicomolybdate, bismuth silicophosphomolybdate, and bismuth phosphotungstate, and of these, a bismuth phosphomolybdate is preferred. Other catalysts which are useful in the present invention include the combined oxides of bismuth and molybdenum, bismuth, molybdenum and optionally phosphorous, promoted by the addition of the oxides of barium and silicon, and the combined oxides of antimony and tin. Still other catalysts useful in the present invention are the combined oxides of antimony and another polyvalent metal oxide and most preferred are the combined oxides of antimony and uranium, antimony and iron, antimony and thorium, antimony and cerium, and antimony and manganese as well as promoted and attrition resistant catalysts of this type which are disclosed in U.S. Pats. 3,186,955; 3,200,081 and 3,200,084.

Other catalysts which are useful in the process of the present invention are disclosed in U.S. Pats. 2,691,037 and 3,009,943.

Still other catalysts which are useful in the process of the present invention are disclosed in Belgian Pats. Nos. 592,434; 593,097; 598,511; 603,030; 612,136; 615,605 and 603,031, Canadian Pat. No. 619,497, French Pat. No. 1,278,289, British Pats. Nos. 874,593 and 904,418, and U.S. Pat. No. 2,481,826.

The catalyst may be prepared by any of the numerous methods of catalyst preparation which are known to those skilled in the art. For instance, the catalyst may be manufactured by co-gelling the various ingredients. The co-gelled mass may be dried in accordance with conventional techniques. The catalyst may be spray dried, extruded as pellets or formed into spheres in oil as is well known in the art. Alternatively, the catalyst components may be mixed with a support in the form of a slurry followed by drying, or may be impregnated on silica or other support. The catalyst may be prepared in any convenient form and preferably as small particles, suitable for use in the fluidized bed reactor. For the purpose of this invention, a catalyst having a particle size between 1 and 500 microns is preferred.

The temperature at which the instant process is conducted may be any temperature in the range of 500 to 1000° F. The preferred temperature range is from about 705 to 950° F.

The pressure at which the reaction is conducted is also an important variable, and the reaction should be carried out at about atmospheric or slightly above atmospheric (2 to 3 atmospheres) pressure. In general, high pressure, i.e., above 250 p.s.i.g., are not suitable for the process since higher pressures tend to favor the formation of undesirable by-products.

The apparent contact time employed in the process is not especially critical. Contact time in the range of 0.1 to 50 seconds may be employed. The apparent contact time is defined as the length of time in seconds which a unit volume of gas measured under the conditions of reaction is in contact with the apparent unit volume of catalyst. The apparent contact time may be calculated, for instance, from the apparent volume of the catalyst bed, the average temperature and pressure of the reaction, and the flow rates in the vessel of the components of the reaction mixture. The optimum contact time will, of course, vary depending upon the olefin being treated; but, in general, it may be said that a contact time of 3 to 15 seconds is preferred.

The equipment required for carrying out the instant process may be of the standard type used in vapor phase oxidation reactions, such equipment being well known to those skilled in the art. For the experimental work in the instant invention, a fluid bed reactor comprising twelve communicating reaction compartments, each communicated with and being separated from the next adjacent one by a foraminous member; the reactor equipped with an injection system was immersed in a molten salt bath. The gaseous reactants and diluents were introduced from pressurized containers fitted with pressure regulators and the amount introduced was measured by flow meters.

The reactants are introduced into the reactor either at reaction temperature by first passing them through a preheater zone or by introducing them directly into the reactor and allowing them to come to reaction temperature as they travel through the catalyst bed.

The reaction products can be recovered by any desirable method. A preferred method is the use of solvent scrubbers. Another method is the use of one or more Dry Ice traps in series which serve to isolate the reaction products by condensing them. The products of reaction were analyzed using standard techniques including gas chromatography, infrared analysis and nuclear magnetic resonance.

While only the preferred form of the invention is described in detail, it will be apparent to those skilled in the art that various modifications may be made therein without departing from the scope of the invention or the scope of the appended claims.

In the examples that follow, the conversion to acrylonitrile is computed on the basis of carbon in the olefin, thus:

$$\text{Percent conversion to acrylonitrile (carbon basis)} = \frac{\text{Wt. of carbon in product of reaction}}{\text{Wt. of carbon in the olefin feed}} \times 100$$

The conversion to CO and $CO_2$ is computed on the basis of the combined carbon in both the olefin and hydrogen cyanide, thus:

$$\text{Percent conversion to CO or } CO_2 \text{ (carbon basis)} = \frac{\text{Wt. of carbon in product of reaction}}{\text{Wt. of carbon in (olefin and HCN feeds)}} \times 100$$

EXAMPLES 1–3

A bismuth phosphomolybdate catalyst was prepared in the following manner:

A solution containing 9.3 cc. of 85% phosphoric acid, 272 g. of molybdic acid (85% $MoO_3$), 40 cc. of nitric acid, and 582 g. of $Bi(NO_3)_3 \cdot 5H_2O$ in 400 cc. of water was added to 750 g. of an aqueous solution of an aqueous colloidal silica sol containing 30% silica. The mixture was then evaporated to dryness and heated at 1000° F. for 16 hours. Subsequently, it was ground and screened to 40–100 mesh.

A volume of 500 ml. of this catalyst was charged into a 1½ inch diameter sieve tray reactor with 11 trays. The reactor was maintained at about 870° F., the pressure in the range of 0–2 p.s.i.g. and a contact time of about 8 seconds was used. The mole ratio of air to propylene was kept constant in all three runs. The ratios of HCN to propylene and water to propylene were changed in the third run.

EXAMPLES 4–6

A catalyst system composed of antimony oxide and uranium oxide, having an Sb:U atomic ratio of 4.56:1 was prepared as follows:

45 parts of antimony metal (through 80 mesh) were completely oxidized in 256 parts of hot, concentrated nitric acid (sp.-gr. 1.42). 40.7 parts uranyl nitrate, $UO_2(NO_3)_2 \cdot 6H_2O$ were added and the mixture evaporated almost to dryness. Then 88 parts of Du Pont Ludox® H-S (containing 30% $SiO_2$) were added. Then ammonium hydroxide (28% solution) was added until the solution registered pH 8. The precipitate was filtered and washed with water. The material was oven-dried at 120° C. for 15 hours, then calcined at 800° F. for 24 hours and finally heat treated at 1800° F. for 8 hours.

The material was cooled and subsequently ball-milled to pass through a 170 mesh screen, then thoroughly ball-milled with another 88 parts of Du Pont Ludox® H-S (containing 30% $SiO_2$) to give a paste which was spray-dried. The spray-dried catalyst was then heat-treated at 1700° F. for 12 hours in a furnace open to the atmosphere.

A volume of 500 ml. of this catalyst was charged into a 1½ inch diameter sieve tray reactor with 11 trays. The reactor was maintained at about 900° F. and the pressure in the range of 0–2 p.s.i.g. A contact time of 8 seconds was used in Examples 4 and 5 and a contact time of 4 seconds was used in Example 6, where a smaller catalyst charge and sieve tray reactor were used. The olefin used in the feed is propylene.

EXAMPLE 7

153.4 parts by weight of stannous chloride ($SnCl_2 \cdot H_2O$) were dissolved in 150 parts by weight of 1% hydrochloric acid. This solution was added slowly to 1500 parts by weight of vigorously stirred water. Simultaneously, 67.75 parts by weight of antimony pentachloride ($SbCl_5$) were added dropwise. When the addition was complete the temperature was raised to 95° C. for five minutes. The mixture was then cooled to room temperature, diluted with 500 parts by weight of water and the pH adjusted to between 5–5.5 by the addition of dilute ammonia solution. The resultant precipitate was filtered, washed by resuspension in water and refiltered. The filtrate was dried at 100° C. and heated in air at 380° C. for three hours. Heating was then continued at 540° C. for 16 hours. The resultant catalyst was then granulated.

500 ml. of this catalyst was placed in the 1½ inch sieve tray reactor with 11 trays. The reactor was maintained at 875° F. at a pressure of 1 p.s.i.g. and a contact time of 8 seconds was used. The olefin in the feed was propylene.

EXAMPLE 8

The following procedure was employed to prepare a catalyst composed of 95% antimony oxide and 5% iron oxide having an Sb:Fe ratio of 8.7:1. 200 g. of antimony metal (less than 270 mesh) was heated in 826.7 cc. of concentrated nitric acid until all red oxides of nitrogen had been given off. To this was added an aqueous solution of 75.96 g. of ferric nitrate nonahydrate $Fe(NO_3)_3 \cdot 9H_2O$. The slurry was diluted with approximately 400 cc. of water. Approximately 500 cc. of 28% ammonium hydroxide was added, bringing the pH to from 7.6 to 8.0. The slurry was filtered, and washed with 400 cc. of 2.5% ammonium hydroxide solution, divided into three portions. Air was drawn through the filter cake for 15 minutes following the last washing. The catalyst was dried overnight at 130° C., calcined at 800° F. overnight, and heat-treated overnight at 1400° F. in a muffle furnace open to the atmosphere.

500 ml. of this catalyst was placed in the 1½ inch sieve tray reactor with 11 trays. The reactor was maintained at 875° F. at a pressure of 2 p.s.i.g. and a contact time of 8 seconds was used. The olefin in the feed was propylene.

EXAMPLE 9

The same catalyst as was used in Examples 1–3 was used in this example. The olefin fed was isobutylene. The contact time was 8 seconds, and other conditions of the reaction were the same as in Examples 1–3 above.

EXAMPLE 10

The same catalyst as was used in Examples 4–6 was used in this example. The olefin fed was isobutylene. The contact time was 8 seconds and other conditions of the reaction were the same as in Examples 4–5 above, except for a higher air ratio.

TABLE I

| Example | Temp., °F. | Mole ratio | | | | Carbon balance | Corrected percent per pass conversion [1] | | | | | | | Unreacted $C_3^-$ | Percent conversion | |
|---|---|---|---|---|---|---|---|---|---|---|---|---|---|---|---|---|
| | | $C_3^-$ | Air | HCN | $H_2O$ | | Acrylonitrile | Acetonitrile | Acrolein | Acetaldehyde | Acetone | CO | $CO_2$ | | $C_3^-$ | HCN |
| 1 | 870 | 1 | 13 | 2 | 2 | 97.8 | 51.6 | 11.4 | Trace | 0.1 | 1.0 | 10.4 | 38.2 | 9.8 | 90.2 | 79.6 |
| 2 | 873 | 1 | 13 | 2 | 2 | 95.5 | 52.5 | 12.0 | -------- | 0.1 | -------- | 9.9 | 36.4 | 11.6 | 88.4 | 77.3 |
| 3 | 861 | 1 | 13 | 1.5 | 1.5 | 91.9 | 46.4 | 10.8 | Trace | Trace | Trace | 12.7 | 35.6 | 6.7 | 93.3 | 75.9 |
| 4 | 898 | 1 | 11 | 2 | 2 | 81.4 | 27.5 | 1.4 | 6.6 | 0.4 | -------- | 13.0 | 26.3 | 8.2 | 91.8 | 26.7 |
| 5 | 900 | 1 | 11 | 2 | 2 | 89.8 | 26.5 | 1.4 | 5.8 | 0.2 | -------- | 14.8 | 24.3 | 14.6 | 85.4 | 26.6 |
| 6 | 900 | 1 | 10 | 1.7 | 15 | 106.5 | 42.8 | 1.1 | 1.1 | 0.2 | -------- | 6.1 | 20.9 | 45.3 | 54.7 | 53.9 |
| 7 | 875 | 1 | 11 | 2 | 2 | 94.9 | 23.2 | 1.0 | 4.4 | 0.2 | -------- | 12.7 | 23.1 | 23.3 | 70.7 | 23.2 |
| 8 | 875 | 1 | 11 | 2 | 2 | 92.7 | 22.7 | 0.9 | 4.9 | 0.2 | -------- | 12.1 | 22.2 | 26.2 | 73.8 | 30.1 |

[1] Corrected for 100 percent carbon balance.

TABLE II

| Example | Temp., °F. | Mole ratio | | | | Carbon balance | Corrected percent per pass conversion [1] | | | | | | | | Unreacted $iC_4^-$ | Percent conversion | |
|---|---|---|---|---|---|---|---|---|---|---|---|---|---|---|---|---|---|
| | | $iC_4^-$ | Air | HCN | $H_2O$ | | Methacrylonitrile | Acetonitrile | Methacrolein | Acetaldehyde | Acetone | Acrylonitrile | CO | $CO_2$ | | $iC_4^-$ | HCN |
| 9 | 870 | 1 | 13 | 2 | 2 | 94.2 | 37.9 | 6.8 | 2.9 | 0.2 | 0.3 | 1.3 | 7.1 | 34.9 | 19.3 | 81.7 | 72.9 |
| 10 | 915 | 1 | 14.6 | 2 | 2 | 92.6 | 12.9 | 1.4 | 14.4 | 0.3 | 0.5 | 0.9 | 7.7 | 31.2 | 21.0 | 79.0 | 28.4 |

[1] Corrected for 100 percent carbon balance.

We claim:
1. A process for the preparation of a nitrile having the structure

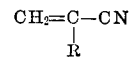

wherein R is selected from the group consisting of H and $CH_3$, comprising reacting a mixture consisting essentially of a monolefin selected from the group consisting of

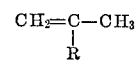

wherein R is the same as above, hydrogen cyanide and a molecular oxygen-containing gas over a vapor-phase monoolefin-oxidation solid catalyst selected from the group consisting of bismuth phosphomolybdate; tin phosphomolybdate; antimony phosphomolybdate; bismuth molybdate; tin molybdate; antimony molybdate; bismuth silicomolybdate; bismuth silicophosphomolybdate; bismuth phosphotungstate; the combined oxides of bismuth and molybdenum; the combined oxides of bismuth, molybdenum and phosphorous; the combined oxides of bismuth and molybdenum promoted by the addition of the oxides of barium and silicon; the combined oxides of bismuth, molybdenum and phosphorous promoted by the addition of the oxides of barium and silicon; the combined oxides of antimony and uranium; the combined oxides of antimony and iron; the combined oxides of antimony and thorium; the combined oxides of antimony and cerium; the combined oxides of antimony and manganese; the combined oxides of molybdenum and tin; and the combined oxides of antimony and tin at a pressure in the range of from 0 to about 50 pounds per square inch gauge and at a temperature in the range of 300° C. to 600° C.

2. The process of claim 1 wherein said monoolefin is propylene.

3. The process of claim 1 wherein said monoolefin is isobutylene.

4. The process of claim 1 wherein the molar ratio of monoolefin to hydrogen cyanide is at least 1:1 and the molar ratio of monoolefin to oxygen is at least 1:1.

5. The process of claim 4 wherein the temperature is in the range of 750° F. to 900° F. and the pressure is in the range of 0.5 to 2.5 pounds per square inch gauge.

6. A process for the preparation of a nitrile having the structure

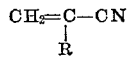

wherein R is selected from the group consisting of H and CH$_3$, comprising reacting a mixture consisting essentially of a monoolefin selected from the group consisting of

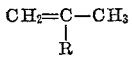

wherein R is the same as above, hydrogen cyanide and a molecular oxygen-containing gas over a vapor-phase monoolefin-oxidation solid catalyst selected from the group consisting of bismuth phosphomolybdate, tin phosphomolybdate and bismuth phosphotungstate, at a pressure in the range of from 0 to about 50 pounds per square inch gauge and at a temperature in the range of 300° C. to 600° C.

7. A process for the preparation of a nitrile having the structure

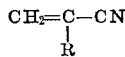

wherein R is selected from the group consisting of H and CH$_3$, comprising reacting a mixture consisting essentially of a monoolefin selected from the group consisting of

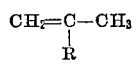

wherein R is the same as above, hydrogen cyanide and a molecular oxygen-containing gas over a vapor-phase monoolefin-oxidation solid catalyst at a pressure in the the of from 0 to about 50 pounds per square inch gauge and at a temperature in the range of 300° C. to 600° C., said catalyst consisting essentially of an active catalytic oxide complex of antimony and uranium as an essential catalytic ingredient, the Sb:U atomic ration being within the range from about 1:50 to about 99:1; said complex being formed by heating the mixed oxides of antimony and uranium in the presence of oxygen at an elevated temperature of above 500° F. but below their melting point for a time sufficient to form said active catalytic oxide complex of antimony and uranium.

8. A process for the preparation of a nitrile having the structure

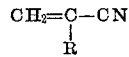

wherein R is selected from the group consisting of H and CH$_3$, comprising reacting a mixture consisting essentially of a monoolefin selected from the group consisting of

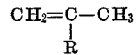

wherein R is the same as above, hydrogen cyanide and a molecular oxygen-containing gas over a vapor-phase monoolefin-oxidation solid catalyst at a pressure in the the of from 0 to about 50 pounds per square inch gauge and at a temperature in the range of 300° C. to 600° C., said catalyst consisting essentially of an active catalytic oxide complex of antimony and iron as an essential catalytic ingredient, the Sb:Fe atomic ratio being within the range from about 1:50 to about 99:1; said complex being formed by heating the mixed oxides of antimony and iron in the presence of oxygen at an elevated temperature of above 500° F. but below their melting point for a time sufficient to form said active catalytic oxide complex of antimony and iron.

References Cited

UNITED STATES PATENTS

| | | | |
|---|---|---|---|
| 3,505,546 | 8/1962 | Milberger | 260—465.3 |
| 3,308,151 | 3/1967 | Callahan et al. | 260—465.3 |
| 3,347,900 | 10/1967 | Gossel et al. | 260—465.3 |
| 3,407,223 | 10/1968 | Kominami et al. | 260—465.3 |
| 3,465,028 | 9/1969 | Kominami et al. | 260—465.3 |
| 3,470,230 | 9/1969 | Hirsch et al. | 260—465.3 |

JOSEPH P. BRUST, Primary Examiner

PO-1050
(5/69)

UNITED STATES PATENT OFFICE
CERTIFICATE OF CORRECTION

Patent No. 3,578,695                Dated May 11, 1971

Inventor(s) Ernest C. Milberger, et al

It is certified that error appears in the above-identified patent and that said Letters Patent are hereby corrected as shown below:

Column 5: after line 15, Table I, title of column 3 "$C_3^-$" should be ---$C_3^=$---

Column 6: Table I, title of column 14 "Unreacted $C_2$" should be ---$C_3$---

Column 6: Table I, title of column 15 "$C_3^-$" should be ---$C_3^=$---

Column 7: Lines 42 & 43, "in the the" should be ---in the range---

Column 8: Line 2, "ration" should be ---ratio---

Column 8: Lines 22 & 23, "in the the" should be ---in the range---

Signed and sealed this 21st day of March 1972.

(SEAL)
Attest:

EDWARD M. FLETCHER, JR.          ROBERT GOTTSCHALK
Attesting Officer                Commissioner of Patents